(12) United States Patent
Eddy

(10) Patent No.: US 7,819,136 B1
(45) Date of Patent: Oct. 26, 2010

(54) HAND WASHING TIMER

(76) Inventor: Zachary P. Eddy, 1543 Dorothy Lois Dr. NE., Albuquerque, NM (US) 87112

( * ) Notice: Subject to any disclaimer, the term of this patent is extended or adjusted under 35 U.S.C. 154(b) by 290 days.

(21) Appl. No.: 11/953,416

(22) Filed: Dec. 10, 2007

(51) Int. Cl.
*F16K 31/02* (2006.01)
*G01F 11/00* (2006.01)

(52) U.S. Cl. .................. 137/624.11; 137/552.7; 4/623

(58) Field of Classification Search ........... 137/624.11, 137/487.5, 801, 552.7; 4/623, 624; 251/129.04
See application file for complete search history.

(56) References Cited

U.S. PATENT DOCUMENTS

| | | | |
|---|---|---|---|
| D281,808 S | 12/1985 | Lemkin et al. | |
| 4,589,435 A * | 5/1986 | Aldrich | 137/102 |
| 4,722,478 A * | 2/1988 | Fletcher et al. | 239/69 |
| D298,962 S | 12/1988 | Bruninga | |
| 4,915,347 A * | 4/1990 | Iqbal et al. | 251/30.03 |
| 5,269,337 A | 12/1993 | Goldsmith | |
| 5,566,702 A | 10/1996 | Philipp | |
| D386,985 S | 12/1997 | Cameron | |
| 5,893,388 A | 4/1999 | Luker | |
| 5,966,753 A * | 10/1999 | Gauthier et al. | 4/623 |
| 6,236,317 B1 * | 5/2001 | Cohen et al. | 137/552.7 |
| 6,250,601 B1 * | 6/2001 | Kolar et al. | 251/129.04 |
| 6,337,635 B1 * | 1/2002 | Ericksen et al. | 340/825.69 |
| 6,340,032 B1 | 1/2002 | Zosimadis | |
| 6,397,888 B1 * | 6/2002 | Wang | 137/624.12 |
| 6,426,701 B1 * | 7/2002 | Levy et al. | 137/552.7 |
| RE37,888 E * | 10/2002 | Cretu-Petra | 236/12.12 |
| 6,543,479 B2 | 4/2003 | Coffey et al. | |
| 6,619,320 B2 * | 9/2003 | Parsons | 137/624.11 |
| 6,882,278 B2 * | 4/2005 | Winings et al. | 4/623 |
| 7,069,941 B2 * | 7/2006 | Parsons et al. | 137/1 |
| 7,094,334 B1 * | 8/2006 | Guzman et al. | 210/87 |
| 7,163,590 B2 * | 1/2007 | DuHack et al. | 134/18 |
| 7,228,874 B2 | 6/2007 | Bolderheij et al. | |
| 7,252,113 B2 | 8/2007 | Jacobs et al. | |
| 7,271,728 B2 | 9/2007 | Taylor et al. | |
| 2003/0192600 A1 | 10/2003 | Ford | |
| 2004/0134847 A1 | 7/2004 | Lin | |
| 2005/0016593 A1 | 1/2005 | Ephrat et al. | |
| 2005/0199842 A1 | 9/2005 | Parsons et al. | |
| 2007/0074767 A1* | 4/2007 | Roffey | 137/487.5 |
| 2007/0089790 A1 | 4/2007 | Hecking | |
| 2007/0151919 A1 | 7/2007 | Klump et al. | |

\* cited by examiner

*Primary Examiner*—Kevin L Lee
(74) *Attorney, Agent, or Firm*—Janeen Vilven; Peacock Myers, P.C.

(57) ABSTRACT

A hand washing timer with a sensor for assisting a user in washing his or her hands for a proper amount of time, for example in accordance with one or more health code regulations. The timer can also include a display, a solenoid valve, a pressure sensor, and/or a float valve.

6 Claims, 4 Drawing Sheets

HAND WASHING TIMER

BACKGROUND OF THE INVENTION

1. Field of the Invention (Technical Field)

Embodiments of the present invention relate to water flow monitors and timers.

2. Description of Related Art

Good hand hygiene practices are a requisite for good health. While personal hand hygiene practices may directly impact the health of an individual, the corporate or institutional practices of individuals associated therewith may greatly impact the health of multitudes of others. It is well known that disease and infection is often communicated from one person to another as a consequence of poor hand hygiene practices by one or more persons in a chain of contact. In the hospitality industry, where employees have contact with food, service ware, bedding and the public, the possibilities for transmitting germs from one person to another are great. Schools, daycare centers, and offices have similar issues. The healthcare industry, however, is particularly dependent upon good personal hygiene.

Concern with avoiding the spread of infectious disease is particularly high in those industries that deal with the public, such as the healthcare and foodservice industries. A single employee, as a result of one incident of carelessness, such as not washing after using the bathroom, can transmit infectious bacteria to a number of patrons. The results can be disastrous, not only to those infected, but also to the employers business and reputation. Because the public interest is clearly at issue, the Food and Drug Administration has promulgated regulations that address washing by foodservice and other personnel. The FDA regulations identify handwashing as a "critical item," such that violations of the rules governing handwashing "are more likely than other violations to lead to food contamination, illness, or environmental degradation." The FDA regulations further specify that personnel must wash twice after using the restroom and use a specified wash procedure. The regulations also require that "a person in charge routinely monitor employee handwashing to ensure that employees are effectively washing their hands."

The failure of workers to employ good hand hygiene practices and to comply with standards for hand hygiene results from opposition based in apathy, time pressures, resistance to change and the like. Indeed, there are many excuses for failure to comply with hand hygiene norms in many key industries. However, compliance with hygiene standards must be complete to minimize the chance of the transmission of infection. The failure of one worker to properly sanitize his or her hands can negate the efforts of all other workers who have been careful to properly sanitize their hands before handling food. Ensuring complete compliance requires constant diligence on the part of supervisors who typically have other pressing duties that can distract them from always effectively monitoring the hygiene of employees.

Although some devices have been constructed to facilitate in providing a predetermined quantity of water, or for timing the flow thereof, such as irrigation timers, such timers cannot be used for providing a timed flow of water for use in washing one's hands because such devices run for timed intervals of several minutes, not seconds. Accordingly, such devices do not have the capability to run for only 15 to 20 seconds as is needed for washing hands. Yet another problem with such known devices is that they do not provide the ability to predetermined or user-determined amount of time upon a user turning on a water faucet.

There is currently a need to ensure that food industry workers and healthcare workers are able to determine how long they should wash their hands in order to meet rules, regulations, and procedures as discussed above.

BRIEF SUMMARY OF THE INVENTION

An embodiment of the present invention relates to an apparatus for timing water flow from a faucet having a timer, a sensor for sensing the flow of water from the faucet wherein the sensor triggers the start of the timer, and a fastener for attaching the apparatus to the faucet. The apparatus can also include a display, a solenoid valve, a digital display, a pressure sensor, a float valve, and or one or more combinations thereof. The display can be an analog or digital display, and the timer can optionally be programmable to a predetermined amount of time. In one embodiment, the solenoid valve stops the flow of water after a predetermined time, which can optionally be provided by the timer of the apparatus. In one embodiment, the delay provided by the timer can be substantially equal to an any one or more of a health-code regulation, a health-industry recommended time for washing an individual's hands, a recommended time for washing an individual's hands, and combinations thereof.

An embodiment of the present invention relates to an apparatus for automatically turning water on and off from a faucet for a predetermined amount of time of less than about one minute including a sensor for detecting when a user wishes to wash his or her hands; a timer for timing a duration of less than about one minute; and a solenoid valve for starting and stopping a flow of water. The sensor can include an infrared sensor, a push-button switch, and/or one or more combinations thereof. The apparatus can also include a display and the display can optionally present a graphical indication of a timed value based on a value of the timer.

A further embodiment of the present invention relates to a method for providing effective hand washing including initiating a timer upon detection of a flow of water from a faucet; providing a delay from the timer; and indicating to a user that a predetermined amount of time has lapsed. Indicating to a user can include providing a graphical or audible indication to a user, or a combination thereof. A user preferably stops washing his or her hands after receiving an indication that a predetermined amount of time has lapsed.

Aspects, advantages and novel features, and further scope of applicability of the embodiments of the present invention will be set forth in part in the detailed description to follow, taken in conjunction with the accompanying drawings, and in part will become apparent to those skilled in the art upon examination of the following, or may be learned by practice of an embodiment of the invention. The aspects and advantages of an embodiment of the present invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

As used herein, "a" means one or more unless otherwise defined.

Figure 1:
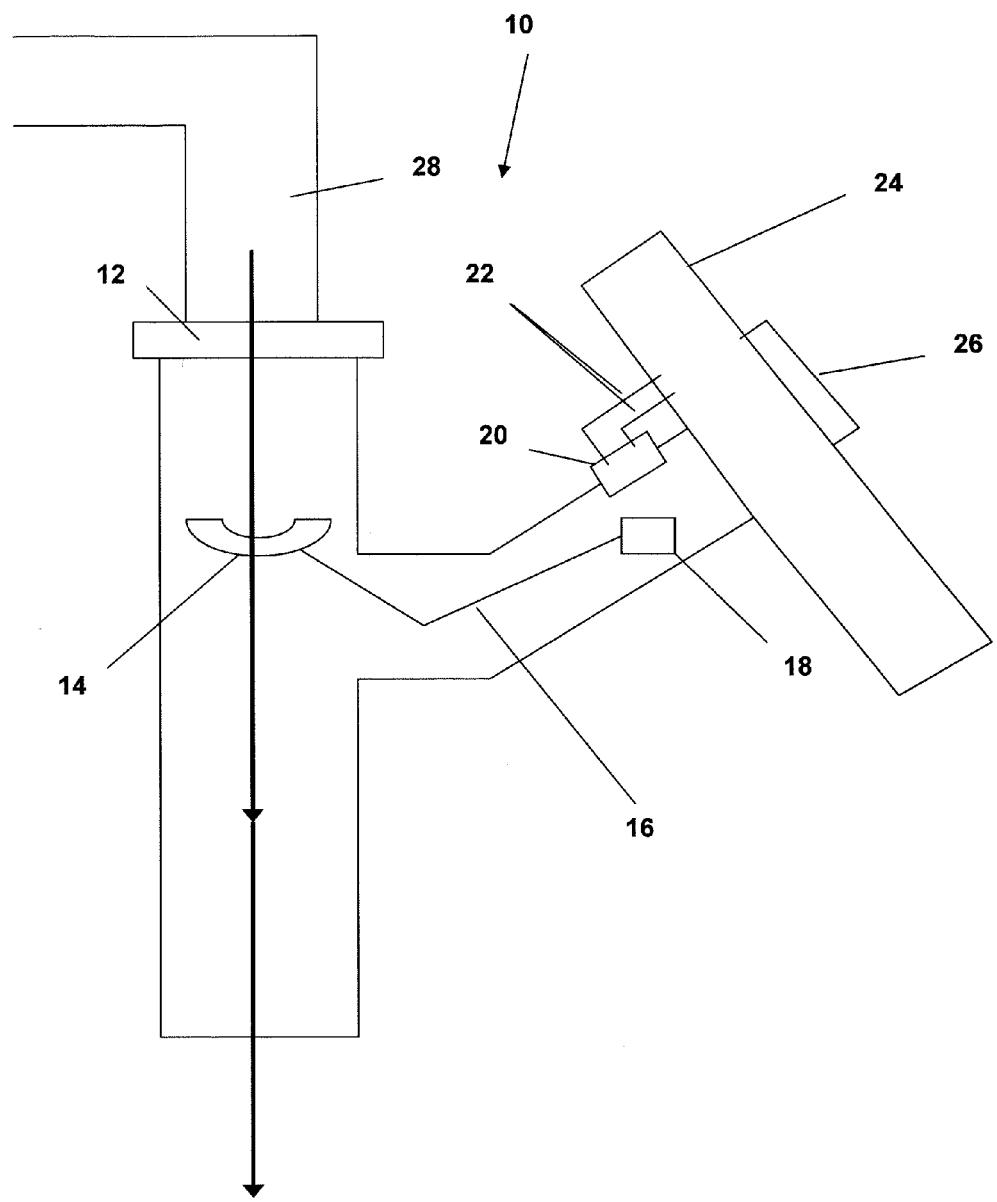
FIG. 1 illustrates an embodiment of the present invention wherein a timer starts when water flow is sensed.

In one embodiment, illustrated in FIG. 1, water faucet timer 10 is preferably a self-contained apparatus comprising fastener 12, wand 14, lever 16, second wand 18, pad 20, wires 22, timer 24, and display 26. Fastener 12 is preferably used to fasten faucet timer 10 to faucet 28. Fastener 12 most preferably comprises internal threads for threadably engaging the treaded end of faucet 28. In this embodiment, when a user activates the flow of water out of faucet 28 and contacts wand 14 the pressure from the water forces wand 14 downward, thus pivotally moving lever 16 causing wand 18 to contact pad 20. When pad 20 is contacted by wand 18, it closes a circuit, thus starting timer 24. Display 26 preferably displays a digital count. In this embodiment, once the count on timer 24 begins, a user can see how long they need to wash their hands. The timer can countdown a time anywhere between approximately 5 to approximately 60 seconds, more preferably, the timer can countdown a time anywhere between approximately 10 to approximately 30 seconds and most preferably, the timer can countdown a timer anywhere between approximately 15 to approximately 20 seconds. Although timer 24 can comprise a counting type of timer, such as the delay provided by a microcontroller, timer 24 can also comprise any apparatus, device, and/or system capable of providing a delay, including but not limited to a resistor-capacitor circuit.

Figure 2:
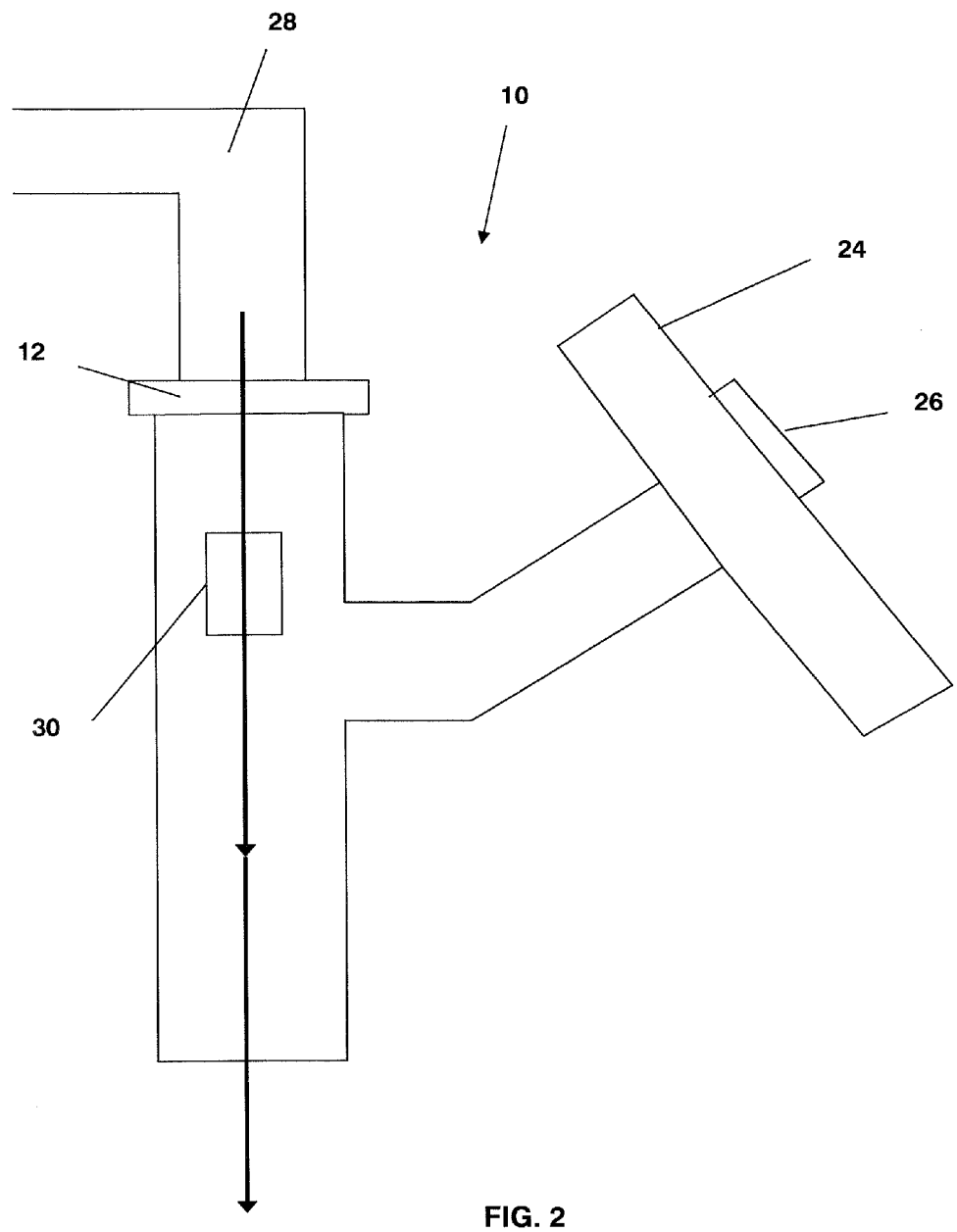
FIG. 2 illustrates another embodiment of the present invention wherein the water is automatically turned on and off.

In another embodiment illustrated in FIG. 2, water sensor 30 senses the flow or presence of water and starts timer 24. When water flows past water sensor 30, timer 24 is preferably activated. In this embodiment, display 26 is optionally provided such that a user can see a graphical representation when the water has flowed for a predetermined or preset amount of time. In this embodiment, water sensor 30 can comprise conductors that sense the water as it flows past or can comprise any other device, apparatus, method, and/or system known to detect the presence of water, or the flow thereof. The foregoing embodiments of the present invention can further comprise a timer reset function such that when a user turns faucet 28 off after washing his or her hands sensor 30 and/or wand 14 preferably detect that the water has stopped flowing and causes timer 24 to be reset or otherwise returned to a starting position.

Figure 3:
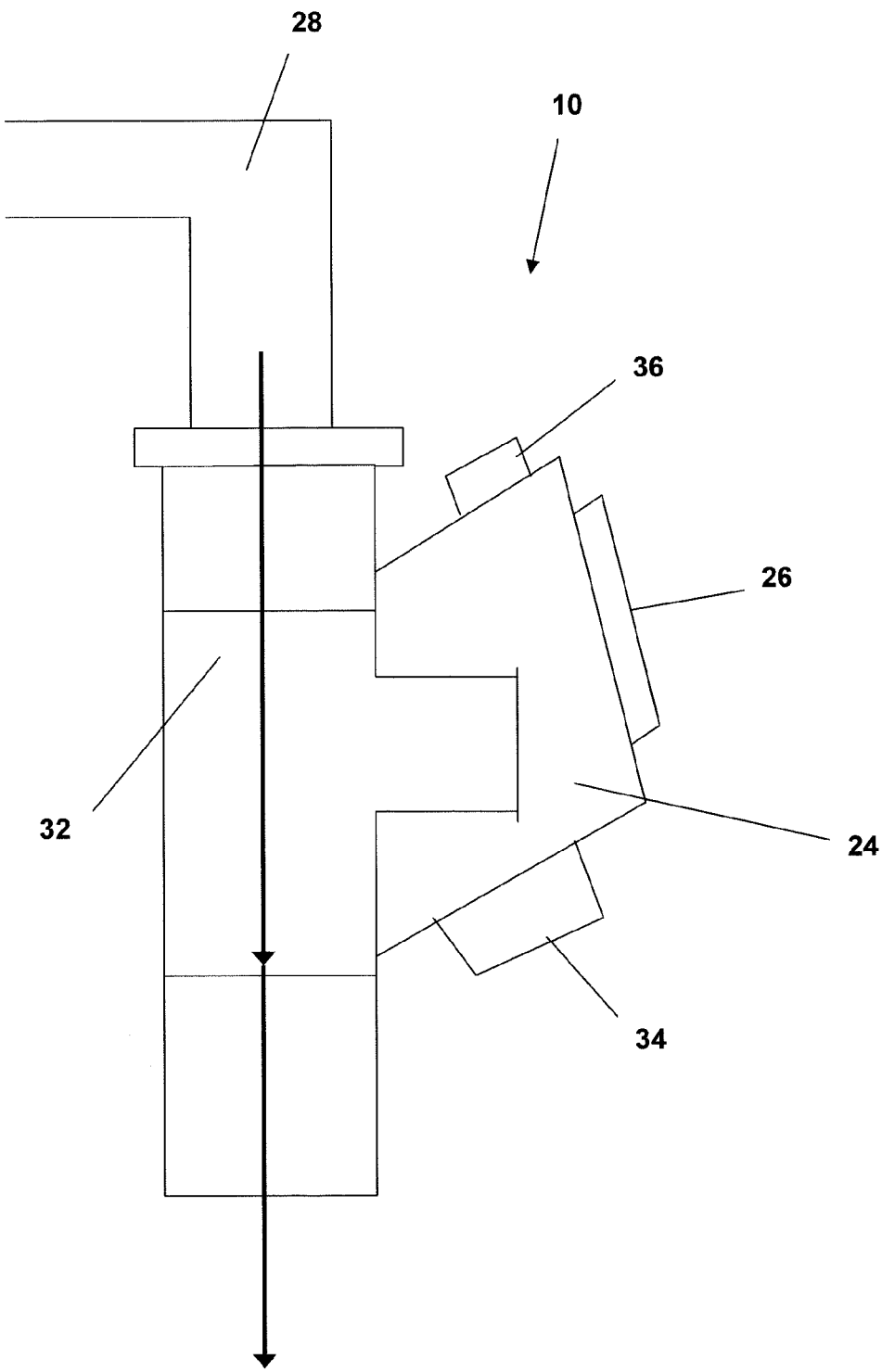
FIG. 3 illustrates an embodiment of the present invention wherein a solenoid valve is provided for initiating and stopping a flow of water.
Figure 4:
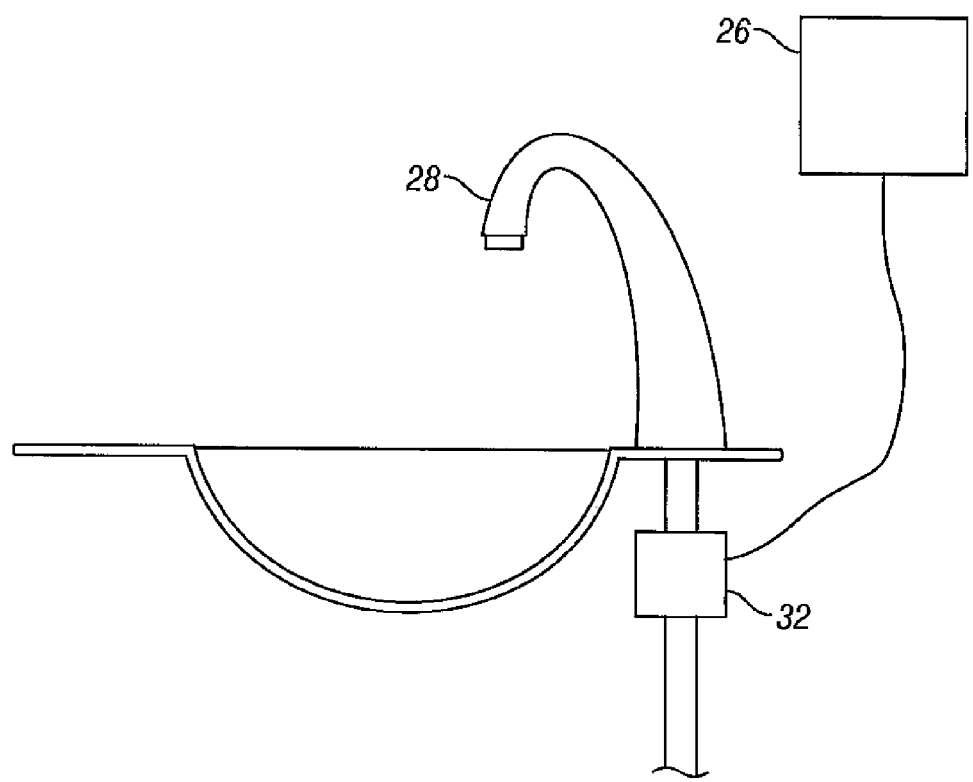
FIG. 4 is a drawing illustrating an embodiment of the present invention.

FIG. 3 illustrates an embodiment of the present invention wherein water faucet timer 10 comprises solenoid valve 32 for activating and deactivating a flow of water automatically after an amount of time. In this embodiment, display 26 can optionally be included to show the user a graphical representation of the time the water has flowed. A graphical representation can include but is not limited to, a countdown, a count up, an icon displayed on a liquid crystal display (LCD), one or more LEDs (for example a green LED can be illuminated indicating that the user is to continue washing his or her hands and a red LED could subsequently be illuminated in indicate that the user may stop washing his or her hands), and/or combinations thereof. This embodiment can also optionally comprise sensor 34 which can be any sensor that detects a user desiring to wash his or her hands. Once sensor 34 detects that a user wishes to wash his or her hands, solenoid valve 32 is preferably activated, and timer 24 is initiated. After the pre-programmed or user-programmed amount of time has lapsed, solenoid valve 32 is preferably caused to close, thus stopping the flow of water. Examples of sensors 34 include, but are not limited to, an infrared sensor that detects when a user puts his or her hands under or near faucet 28, a button that a user pushes, or any other apparatus, device, or system which can be used to detect a user wishing to wash his or her hands.

In yet another embodiment, solenoid valves are not provided. In this embodiment, a user activates and deactivates a flow of water manually after a pre-programmed or user-programmed amount of time has passed as is preferably indicated by the present invention. In this embodiment, a display can be optionally included to show the user a graphical representation of the time the water has flowed. In each of the foregoing embodiments, sound-emitting device 36, such as a buzzer, a piezoelectric speaker, an electromagnetic speaker, or the like is optionally provided in conjunction with, or in lieu of display 26.

An embodiment of the present invention relates to a water faucet timer that is triggered by the flow of water and preferably attaches to the end of a faucet. The water faucet timer is preferably started by one or more of the following, including but not limited to, using a mechanically movable detector to detect the flow of water, using water to complete a circuit between two contacts that triggers a timer, using a pressure sensor where pressure from the flow of water triggers the timer, using a flow sensor to detect the flow of water, and any other way one skilled in the art can sense water flow.

In one embodiment, when the timer completes counting or otherwise provides the predetermined or user-determined delay, it can produce a sound to let the user know they have washed their hands long enough, it can automatically shut off the water, it can graphically illustrate that a sufficient amount of time has lapsed, it can produce a visual indicator and/or combinations of these. Alternatively, the timer can be pre-programmed or user programmed and it can display a timed count using liquid crystal display (LCD) or other display device.

An embodiment of the present invention comprises a self-charger which includes a rechargeable battery to provide electrical power to the water flow monitor, display, and/or associated electronic components. The self-charging function can easily be accomplished by providing a small turbine within the flow of the water along with a rectifying circuit or via any other manner known to those skilled in the art. An analog or digital timer preferably determines and/or displays how long the faucet must run to wash the user's hands according to pre-set or user defined criteria.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for timing water flow from a faucet comprising:
   a timer preset to a predetermined amount of time;
   a sensor for sensing the flow of water from the faucet wherein said sensor triggers the start of said timer; and
   a fastener for attaching said apparatus to the faucet;

a solenoid valve, wherein said solenoid valve stops the flow of water after said predetermined amount of time; and a display displaying a graphical count-up from zero to said predetermined amount of time.

2. The apparatus of claim 1 wherein said timer is programmable.

3. The apparatus of claim 1 wherein said display comprises a digital display.

4. The apparatus of claim 1 wherein said sensor comprises a pressure sensor.

5. The apparatus of claim 1 wherein said sensor comprises a float valve.

6. The apparatus of claim 1 wherein said timer provides a delay substantially equal to an element selected from a list consisting of a health-code regulation; a health-industry recommended time for washing an individual's hands; a recommended time for washing an individual's hands, and combinations thereof.

* * * * *